Oct. 20, 1953 W. A. WASEMANN 2,656,236
WASHING APPARATUS
Filed Dec. 6, 1949 3 Sheets-Sheet 1

INVENTOR
William A. Wasemann
BY
ATTORNEY

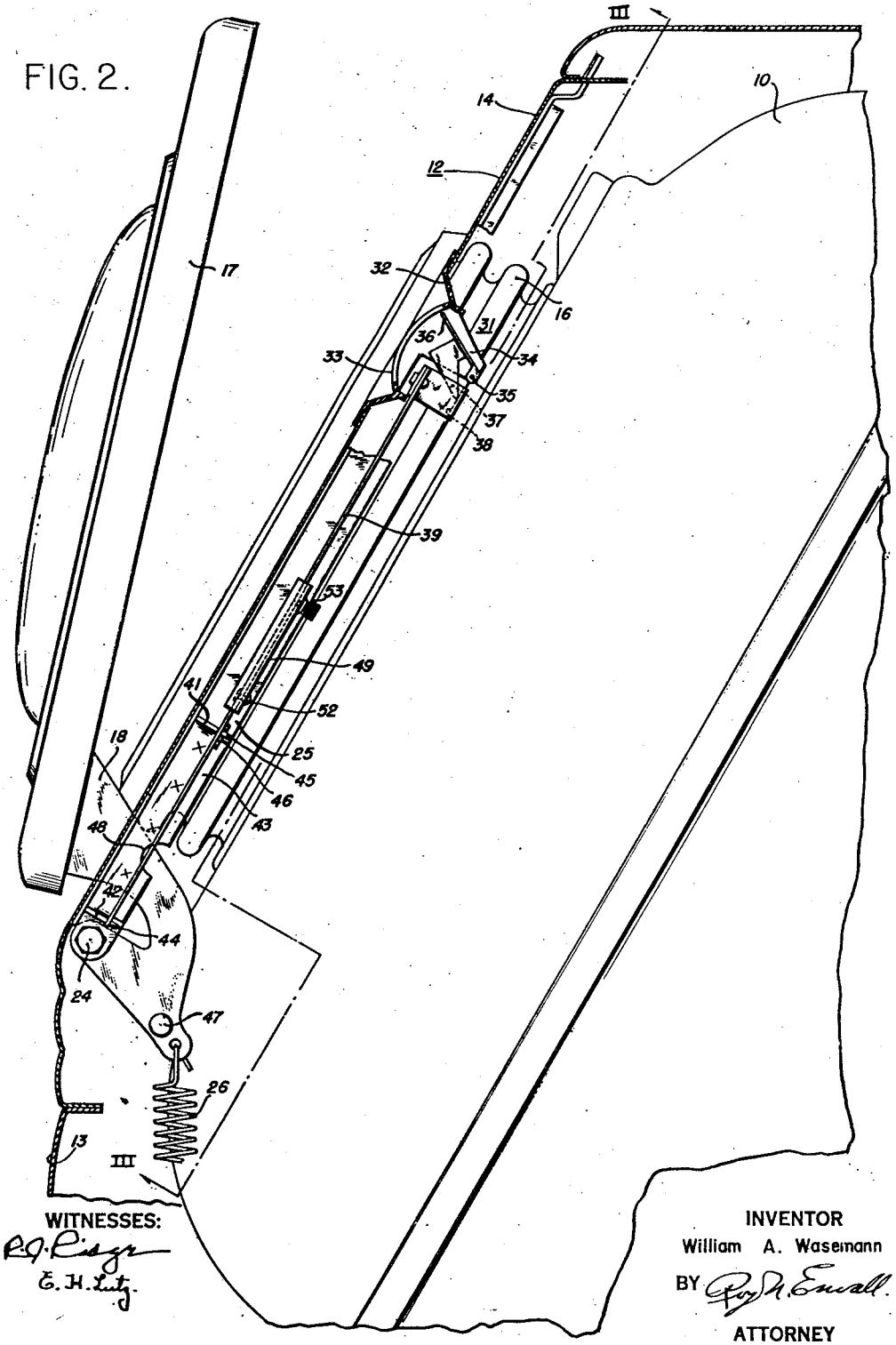

Patented Oct. 20, 1953

2,656,236

UNITED STATES PATENT OFFICE 2,656,236

WASHING APPARATUS

William A. Wasemann, Mansfield, Ohio, assignor to Westinghouse Electric Corporation, East Pittsburgh, Pa., a corporation of Pennsylvania Application December 6, 1949, Serial No. 131,445

2 Claims. (Cl. 312—234)

My invention relates to clothes washing apparatus and has for an object to provide improved apparatus of this kind.

In the operation of clothes washing machines, and particularly machines of the domestic type, it is frequently desirable to wash batches of clothes smaller in weight than the largest size batch for which the machine is designed. When small size batches are washed, a smaller quantity of water and detergent is employed in the interest of economy. Some machines are equipped with mechanisms for providing different water levels in response to manual movement of a handle to different selective positions. Recommendations are made by manufacturers for different specific water levels for different size bundles of clothes to be washed. In order to follow such recommendations, the operator must weigh the clothes to determine the proper water level. In accordance with my invention, the door of the washer, when moved to a horizontal, open position, is utilized as a weighing platform and a scale is provided on the washer and operated by the door. The indicia of the weighing device may be graduated in pounds or may indicate directly the water level to be employed. In other words, the indicia on the weighing device and the water level control knob may be similar and the readings on both should correspond prior to starting the washer. Preferably, in a cabinet-type washer, the indicating scale of the weighing device is located on the cabinet in a region thereof which is covered by the door when the latter is closed, for the sake of appearance.

It is, therefore, a further object of my invention to provide an improved mechanism for weighing fabrics admitted to a washing machine, which mechanism is actuated by the door of the machine.

A still further object of the invention is to provide an improved clothes weighing mechanism for a washer which indicates the amount of water to be admitted to the machine for the washing operation.

The foregoing and other objects are effected by my invention as will be apparent from the following description and claims taken in connection with the accompanying drawings, forming a part of this application, in which:

Fig. 2 is a vertical, sectional view taken through the casing of the washer and illustrating the weighing mechanism, certain elements of the washer in this view being shown in elevation;

Figure 1:
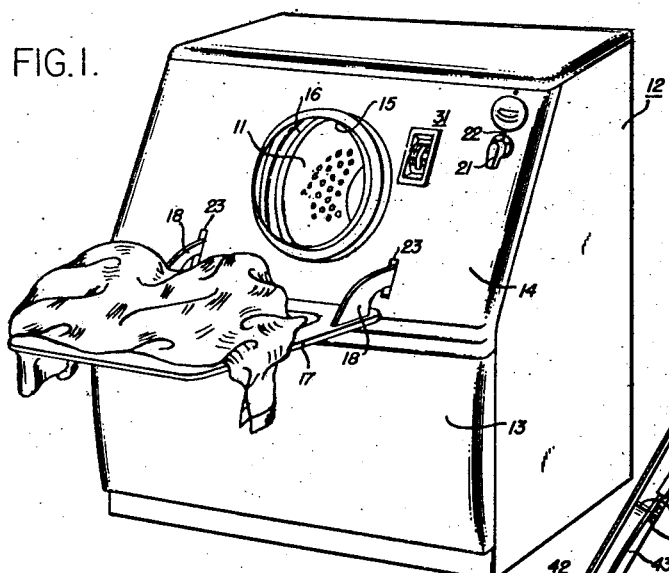
Fig. 1 is a perspective view of a washing machine having my improved clothes weighing mechanism applied thereto.

Referring now to the drawing, I have disclosed my invention aplied to a domestic clothes washing machine of the type shown in Breckenridge Patent No. 2,343,742 granted March 7, 1944. This type of machine includes a tub structure 10 for containing a body of washing water and a perforate basket 11 for containing the fabrics to be washed (see Figs. 1 and 2). The fabrics are cleaned by tumbling in the basket 11 which is rotated by a conventional driving mechanism (not shown), all of which is now well understood. The tub 10 is suitably mounted within a casing 12, having a front wall 13, the upper portion 14 of which is inclined rearwardly and upwardly as shown. An access opening 15 for the washer is defined by a tubular wall 16 connecting the cabinet wall portion 14 and the tub 10 and which may be formed of resilient material to permit relative movement between the tub 10 and housing 12 in the event that the tub 10 is flexibly mounted. A door 17 carried by a pair of brackets 18 hinged to the housing 12, as described hereinafter, closes the opening 15 during operation of the washer and is moved to a horizontal position, as shown, for receiving the fabrics to be admitted to the washer or removed therefrom during the servicing of the washer by the operator.

Figure 6:
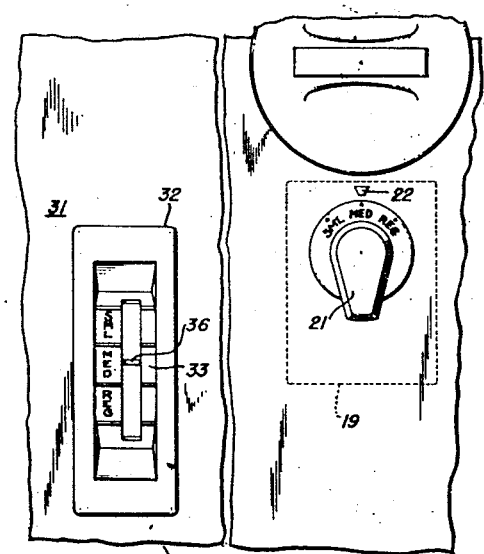
Fig. 6 is a front view of a part of the casing of the washer and showing conventional control handles and the indicator of the weighing device.
Figure 5:
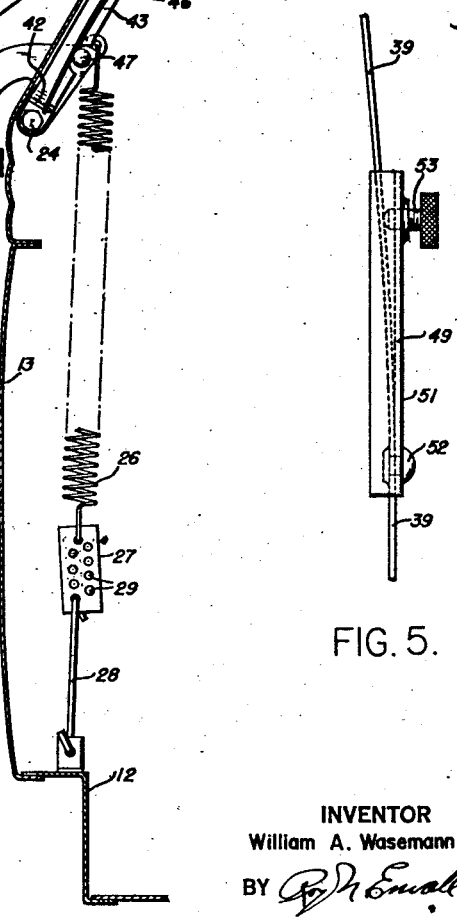
Fig. 5 is an enlarged view of a spring adjusting device shown in Figs. 2 and 4.
Figure 3:
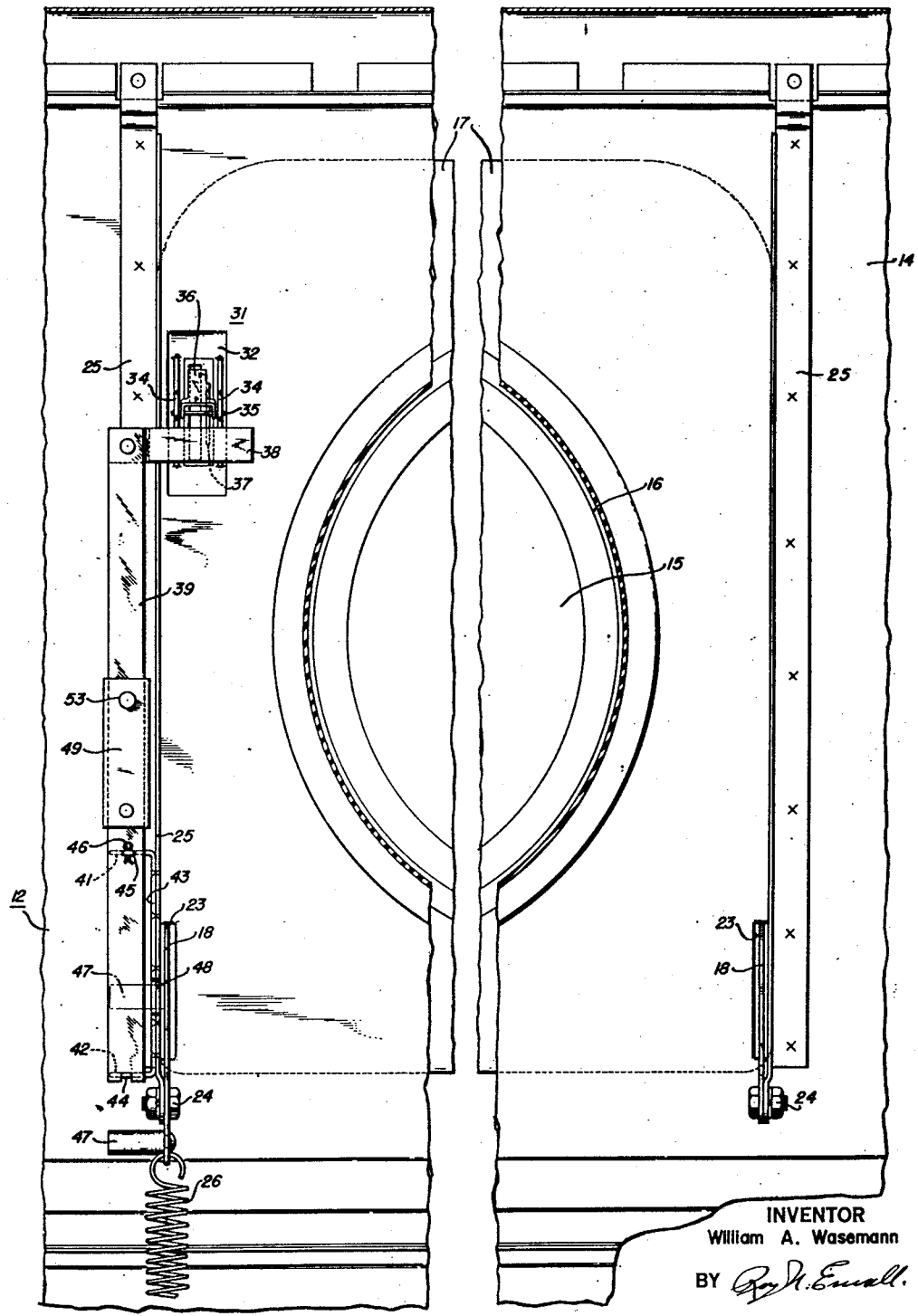
Fig. 3 is a section taken along the line III—III of Fig. 2.

The washer is provided with a suitable adjustable water level control mechanism, indicated generally at 19, for regulating the amount of water which is admitted to the washer. The water control mechanism 19 is not shown in detail for the sake of brevity and since the specific form of control mechanism which is employed forms no part of the present invention. One form of water level control which may be employed is disclosed in the copending application of Eldred O. Morton, Serial No. 5,537 filed January 31, 1948, and assigned to the assignee of the present application. An adjusting handle 21 is provided for adjusting the water level control mechanism 19 to selectively provide a large or regular quantity of water in the tub for the washing of a large batch of fabrics such as, for example, nine pounds of fabrics, a smaller or medium quantity of water for the washing of six pounds of fabrics or a small quantity of water for the washing of three pounds of fabrics. Indicia, indicated as SML, MED and REG are provided on the handle 21 and are moved selectively opposite an arrow or index 22 (Fig. 6) to provide small, medium or regular quantities of washing water in the tub.

Figure 4:
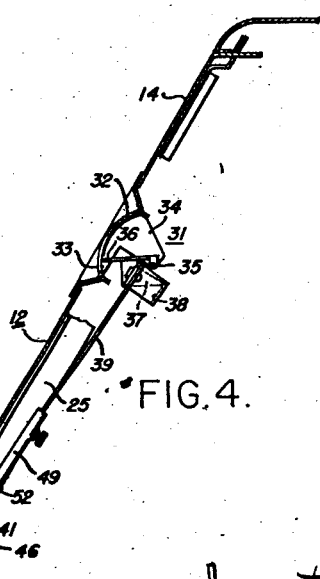
Fig. 4 is a sectional view similar to Fig. 2 but showing the casing door in its open position and omitting portions of the washer mechanism for the sake of clearness.

In accordance with my invention, the door 17, when moved to a horizontal position, defines a weighing platform of a scale for indicating the weight of a bundle of fabrics which are placed on the door prior to their admission to the washing machine. As best shown in Figs. 2 to 5, inclusive, the supporting brackets 18 of the door 17 extend through a pair of openings 23 in the portion 14 of the casing front wall. The brackets 18 are pivotally supported by a pair of bolts 24 which are secured to tie members 25 shown, by way of example, as angle irons welded or otherwise secured to the front wall portion 14 of the casing. A tension spring 26 is attached at its upper end to one of the brackets 18 and counterbalances the door when the latter is in its open position. As shown in Fig. 4, the lower end of the tension spring 26 is attached to a bias adjusting plate 27 which is tied to the casing structure 12 by a tension member 28. The plate 27 is provided with a plurality of spaced holes 29 for, selectively, receiving the end of the tension member 28, whereby the bias of the spring 26 is adjustable, all of which is well understood.

The weighing mechanism includes an indicator, generally represented by the reference character 31 and carried by the front wall portion 14 of the casing 12. The indicator 31 includes a dial member 32 preferably molded of translucent plastic and suitably supported on the front of the casing wall portion 14. The dial member 32 has a rounded surface 33 carrying indicia SML, MED and REG which represent small, medium and large bundles of clothing of, for example, 3, 6 and 9 pounds, respectively. Dial member 32 is formed with a pair of rearwardly extending bosses 34 which carry a pin 35 for pivotally supporting a movable index or pointer 36. The latter is biased by gravity counterclockwise, as viewed in Figs. 2 and 4, and is provided with a projection 37 which bears against a plate 38 fixed in any suitable manner to one end of a flat leaf spring 39. The opposite end and an intermediate portion of the leaf spring 39 are supported by a pair of projections 41 and 42 formed on a U-shaped bracket 43, the latter being fixed in any well understood manner to one of the angle irons 25. A slot 44 formed in one end of the leaf spring 39 receives the projection 42 while an aperture 45 formed in an intermediate portion of the leaf spring receives the projection 41. A cotter pin 46 extending through the projection 41 maintains the leaf spring 39 in position on the bracket 43.

When the door 17 is moved to the horizontal position, a stud, indicated at 47, and carried by one of the brackets 18 engages the leaf spring, as best shown in Fig. 4. As fabrics are deposited on the door, the latter moves counterclockwise in opposition to the bias of the tension spring 26 and also the bias of the leaf spring 39. Accordingly, the portion of the leaf spring intermediate the ends of the U-shaped bracket 43 is bowed to the left, as viewed in Figs. 2 and 4, and the free end of the spring 39 and the plate 38 will move to the right for permitting the pointer 36 to swing counterclockwise about the pivot 35 and, thereby indicate the weight of the load of fabrics on the door. When the maximum load of fabrics, for example nine pounds, is deposited on the door, the stud 47 will engage a fixed stop which is defined by a curved surface 48 formed in the angle iron member 25 and the U-shaped bracket 43. Accordingly, further deflection of the leaf spring 39 is prevented.

In order to adjust the position of the pointer 36 when calibrating the weighing mechanism, an adjustment indicated at 49 is provided in an intermediate portion of the leaf spring 39. The adjustment 49 includes a plate 51 to which the leaf spring 39 is securely fastened by means of a rivet 52 (see Fig. 5). Spaced from the rivet 52 is an adjusting screw 53 threaded in the plate member 51 and bearing against the spring 39. By threading the screw 53 inwardly and outwardly, the free end of the leaf spring 39 may be moved for adjusting the position of the pointer 36 relative the indicia formed on the member 32.

In operating the mechanism, the operator deposits a load of fabrics upon the door 17 in its open position. Assuming the batch weighs six pounds, the pointer 36 will register with the index MED on the dial 33 which represents a medium size load (see Fig. 6). The operator then adjusts the water control handle 21 to its index MED to provide a medium size body of washing water in the tub. Accordingly, the fabrics are cleaned under conditions which are optimum and the operator is relieved of any mental operations in preparing the wash other than to merely set the water control handle 21 to the setting indicated by the pointer 36 of the weighing mechanism.

From the foregoing description, it will be apparent that I have provided an improved washer for fabrics including a novel weighing mechanism for the bundle of fabrics to be treated. Preferably, the indicia on the weighing mechanism and water control are similar in order to facilitate the adjustment of the machine by the operator for the most efficient operation. The construction of the weighing mechanism is such that it may be readily and most economically manufactured. Furthermore, adjustment of the weighing mechanism may be easily carried out. As set forth, the visible portion of the weighting mechanism is so located upon the cabinet that it is covered by the door when the machine is inactive for the sake of appearance.

While I have shown my invention in but one form, it will be obvious to those skilled in the art that it is not so limited, but is susceptible of various changes and modifications without departing from the spirit thereof.

What I claim is:

1. In combination, a casing structure, a platform structure hinged to the casing structure and movable between a first position and a second, generally horizontal position for the reception of articles to be weighed, means secured to said casing structure for indicating the weight of articles placed on said platform structure, an elongated leaf spring, spaced first and second members mounted on said casing structure for supporting said spring, said first member engaging one end of the spring and said second member engaging a portion of said spring intermediate its ends, means connecting the opposite end of said spring and said indicating means for actuating the latter and a projection carried by said platform structure and engaging said spring intermediate said first and second supporting members when said platform structure is in its second position.

2. The combination as claimed in claim 1 wherein said indicating means is disposed in a region of the casing structure which is covered by the platform when the latter is disposed in said first position.

WILLIAM A. WASEMANN.

References Cited in the file of this patent

UNITED STATES PATENTS

| Number | Name | Date |
| --- | --- | --- |
| 2,036,635 | Kingsbury | Apr. 7, 1936 |
| 2,057,024 | Gunnison | Oct. 13, 1936 |
| 2,210,851 | Davis | Aug. 6, 1940 |
| 2,412,270 | Johnston | Dec. 10, 1946 |